United States Patent [19]

Clemetson et al.

[11] 3,714,460

[45] Jan. 30, 1973

[54] EXCLUSIVE OR CIRCUIT

[75] Inventors: Warren Jay Clemetson, Stiring; Kaneyuki Kurokawa, Murray Hill, both of N.J.

[73] Assignee: Bell Telephone Laboratories, Incorporated, Murray Hill, N.J.

[22] Filed: Sept. 10, 1971

[21] Appl. No.: 179,418

Related U.S. Application Data

[63] Continuation-in-part of Ser. No. 101,380, Dec. 24, 1970, abandoned.

[52] U.S. Cl. ....................307/216, 307/282

[51] Int. Cl. ....................H03k 19/32

[58] Field of Search......307/216, 217, 232, 270, 282; 328/65

[56] References Cited

UNITED STATES PATENTS

| | | | |
|---|---|---|---|
| 3,034,062 | 5/1962 | Bleam | 328/65 X |
| 2,934,270 | 4/1960 | Logue et al. | 307/216 X |
| 3,106,683 | 10/1963 | Creveling | 307/216 X |
| 3,148,334 | 9/1964 | Danielsen et al. | 307/232 X |
| 3,171,976 | 3/1965 | Hoffman | 328/65 X |

*Primary Examiner*—John S. Heyman
*Attorney*—R. J. Guenther et al.

[57] ABSTRACT

An exclusive OR circuit comprises a primary winding having two input terminals and being closely coupled to first and second secondary windings. Rectifying diodes are connected to adjacent ends of the first and second secondary windings, which are adjacent the center of the primary winding. This configuration transmits an output pulse through one of the diodes only upon the application of one input pulse to one of the input terminals, and gives high speed voltage cancellation if coincident pulses are applied. In another embodiment, transistors used in place of the diodes give signal gain.

10 Claims, 4 Drawing Figures

EXCLUSIVE OR CIRCUIT

This is a continuation-in-part of our copending application, Ser. No. 101,380 filed Dec. 24, 1970, now abandoned and assigned to Bell Telephone Laboratories, Incorporated.

BACKGROUND OF THE INVENTION

This invention relates to logic circuits, and more particularly, to high speed exclusive OR circuits.

Logic circuits are used for indicating, by the transmission of an output signal, any of various combinations of input signals. The logic circuit known as "exclusive OR" indicates the presence of any of a plurality of signals accompanied by the simultaneous absence of all others. In its most usual form, an exclusive OR circuit having two input terminals will generate an output signal in response to a single input signal, but not in response to two input signals.

While exclusive OR logic circuits are normally associated with digital computer systems, we have found that they are useful in modulator circuits for new four-level modulators used in pulse code modulation (PCM) microwave transmission systems.

Separate modulators are used for each channel in each repeater station of the transmission system to modulate the phase of millimeter wavelength carriers at extremely high pulse repetition rates. Thus, it is important that such exclusive OR circuits be responsive to high frequencies while being simple, inexpensive, and easy to maintain.

Conventional logic circuits used in computers typically comprise a plurality of gate circuits which may operate together in any of various combinations. For the purpose described above, these circuits tend to be unduly complex and, because of their unavoidable stray reactances, of relatively slow speed. The device described in the patent of Candy, U.S. Pat. No. 3,254,232, issued May 31, 1966 and assigned to Bell Telephone Laboratories, Incorporated, reduces the effects of stray reactances, but is still relatively complex and expensive. Further, it is designed to transmit output energy to a balanced load, while for our purposes it is preferable to use an unbalanced load; that is, a two-terminal load having one terminal at a fixed potential, such as ground potential. If the Candy circuit is designed to operate into an unbalanced load, its high speed capabilities are necessarily impaired.

SUMMARY OF THE INVENTION

It is an object of this invention to provide a simple, high-speed exclusive OR circuit.

This and other objects of the invention are attained in an illustrative embodiment of the type described in the Abstract of the Disclosure. As will become clear later, this circuit is of simple construction and has extremely high frequency capabilities. The circuit transmits output signals to an unbalanced load as is usually convenient for modulator circuit purposes.

These and other objects, features, and advantages of the invention will be better understood from a consideration of the following detailed description taken in conjunction with the accompanying drawing.

DRAWING DESCRIPTION

DETAILED DESCRIPTION

The exclusive OR logic function is, of course, widely used in modern electronic computers and is normally performed by an arrangement of gate circuits. These gate circuit arrangements are frequently designed to perform a succession of AND and inhibit functions as is known in the art. In our design of an exclusive OR circuit, we tried to use new approaches in an effort to simplify its structure, and the first circuit we designed is that shown in FIG. 1.

Figure 1:
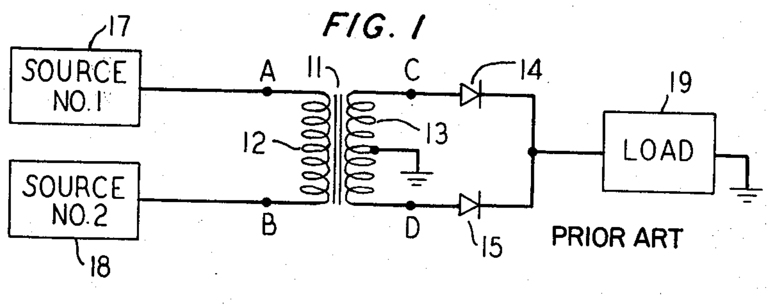
FIG. 1 is a schematic diagram of a prior art circuit that was developed in the course of making the invention.

The exclusive OR circuit of FIG. 1 comprises a transformer 11 having a primary winding 12 and a secondary winding 13 connected to diodes 14 and 15. The two input terminals of the primary winding are connected to input sources 17 and 18. The purpose of the circuit is to transmit an output pulse to a load 19 in response to an input pulse from either, but not both, sources 17 and 18.

If a positive input pulse is transmitted from source 17 to terminal A of the primary winding, a positive pulse will appear at terminal C of the secondary winding and be transmitted through rectifying diode 14 to load 19. A negative pulse will also be induced at secondary winding terminal D, but, because of its negative polarity, will not be transmitted through diode 15. Likewise, a positive pulse at terminal B will produce a positive pulse at terminal D that will be transmitted through diode 15 and a negative pulse at terminal C that is not transmitted. If positive pulses are simultaneously transmitted to both terminals A and B, positive and negative pulses will be generated at terminals C and D which theoretically will cancel out so that no output pulse is generated.

In practice, however, a delay occurs between the time at which generated pulses appear at secondary winding terminals C and D, which delay corresponds to the time taken for an input pulse to travel from terminals A to B. For example, if a positive pulse appears at output terminal C in response to an input pulse at A, a negative pulse will appear at terminal D only after a time period equal to the propagation time of the pulse from terminals A to B. Thus, if pulses are simultaneously applied to terminals A and B, simultaneous cancellation does not take place at terminals C and D and a very short output pulse may be delivered to the load 19.

The circuit of FIG. 1 is deficient only when the propagation time between terminals A and B is significant with respect to the response time of the separate components. For most computer applications, this propagation time is insignificant and the circuit of FIG. 1 operates satisfactorily. When the pulse repetition rates and frequency response times are extremely high, as required in millimeter wave transmission systems, the circuit of FIG. 1 may give an inaccurate signal output in response to simultaneous pulse inputs.

Figure 2:
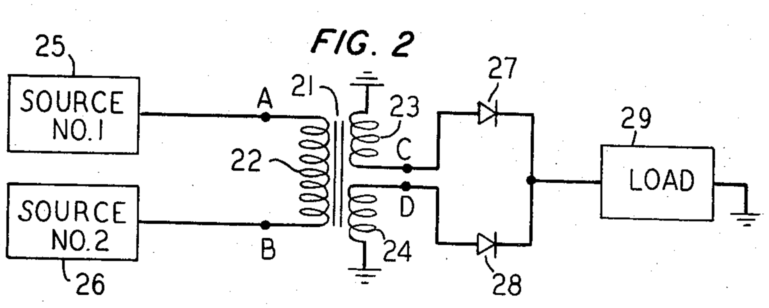
FIG. 2 is a schematic diagram of an illustrative embodiment of the invention.

This deficiency is eliminated in the circuit of FIG. 2 which comprises a transformer 21 having a primary winding 22, a first secondary winding 23, and a second secondary winding 24. As before, primary terminals A and B are connected to input sources 25 and 26 while secondary winding terminals C and D are connected to rectifying diodes 27 and 28. The diodes are connected to a conventional load circuit 29. Transformer 21 is symmetrical; the first secondary winding 23 is closely coupled to and coextensive with one half of the primary winding 22, while the second secondary winding 24 is closely coupled to and coextensive with the other half of the primary winding 22. While we have shown a turns ratio of one, it is to be understood that other ratios could be used. Terminals C and D are both adjacent the center of the primary winding.

It can be appreciated that, with the configuration of FIG. 2, a pulse transmitted through either primary terminal A or B induces pulses simultaneously at secondary terminals C and D. Thus, if input pulses are transmitted simultaneously to primary winding terminals A and B, there will be no delay between primary and compensating voltages at terminals C and D, and the circuit will not suffer the disadvantages of FIG. 1.

Figure 3:
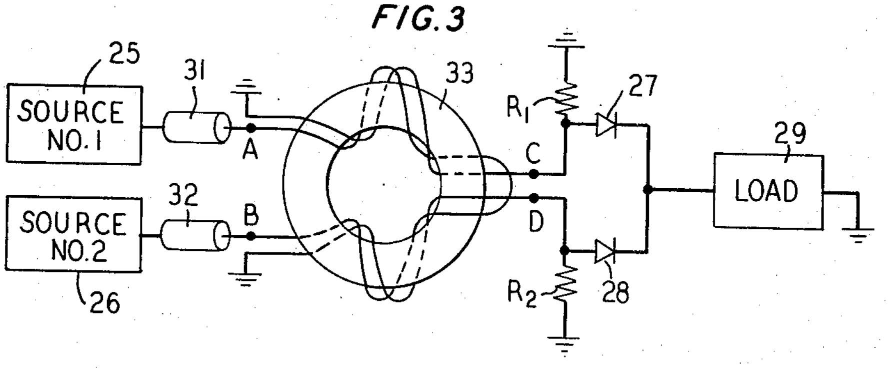
FIG. 3 is a schematic diagram illustrating a preferred implementation of the circuit of FIG. 2.

The circuit of FIG. 2 is preferably implemented by the structure schematically shown in FIG. 3. Pulses from the input sources 25 and 26 may be transmitted to input primary winding terminals A and B by coaxial cables 31 and 32. Half of primary winding 22 is intertwined with first secondary winding 23 while the other half of the primary winding is intertwined with the second secondary winding 24. Both the primary and secondary windings are wound about a magnetic core 33 which gives extremely tight inductive coupling between the primary and secondary windings to reduce reactive losses as required for high speed operation. The resistors $R_1$ and $R_2$ connected to the diodes are included for impedance matching purposes.

In one illustrative embodiment, a magnetic core was used having an outer diameter of 225 mils, an inner diameter of 110 mils and a thickness of 65 mils. No. 32 wire was used for the primary and secondary windings. The primary winding 22 was wound with 12 turns about the magnetic core with each secondary winding 23 and 24 having six turns. Diodes 27 and 28 were high speed Schottky barrier diodes available from the Hewlett-Packard Company as HP5082–2800 diodes. The resistors were each 100 ohms. The circuit operated satisfactorily at information rates of 300 megabits which corresponds to a pulse separation of 3 nanoseconds.

Figure 4:
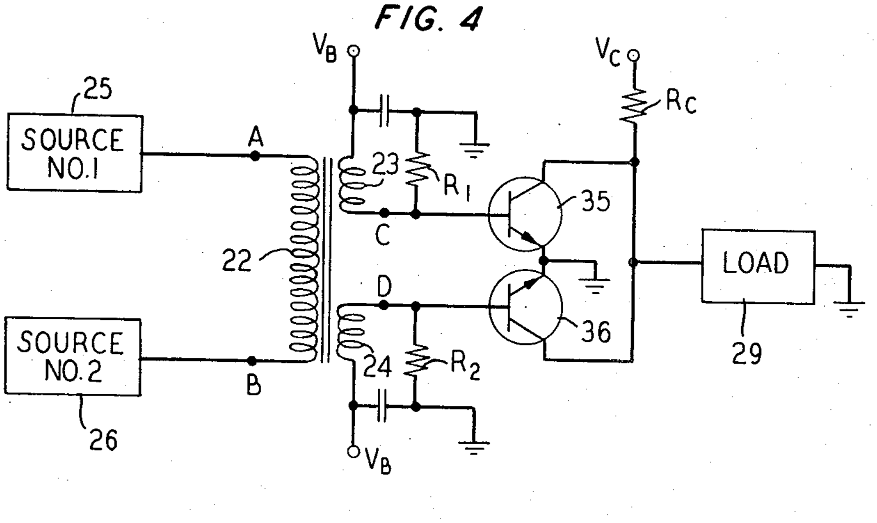
FIG. 4 is a schematic diagram of an exclusive OR circuit in accordance with another embodiment of the invention.

One disadvantage of the FIG. 3 embodiment is the inevitable loss or attenuation as signals are transmitted through the circuit. This problem can be avoided by replacing the diodes with transistors, as schematically illustrated in FIG. 4. As before, an output pulse is transmitted to load 29 of FIG. 4 only if a single input pulse appears at input terminals A or B. The transformer windings 22, 23, and 24 may be formed as shown in FIG. 3. Rather than diodes, the bases of transistors 35 and 36 are connected to secondary winding transformer terminals C and D. With an appropriate base bias voltage $V_B$, preferably supplied through secondary windings 23 and 24, as shown, and a collector bias voltage $V_C$, supplied through a collector resistance $R_C$, the transistors 35 and 36 will provide enough amplification to compensate for all circuit losses.

In an experimental version of the FIG. 4 circuit, transistors 35 and 36 were high-speed NPN silicon switching transistors with a unity gain frequency greater than three gigahertz. The voltage $V_B$ was 0.1 volts and $V_C$ was 6 volts. Resistors $R_1$, $R_2$, and $R_C$ were each 100 ohms. With these parameters, the overall circuit gain was slightly greater than one, and the rise time, fall time, and delay time were all less than 0.5 nanoseconds.

It can be appreciated that the circuits shown are simple and inexpensive, and are capable of high frequency response both because of their design and because of the limited number of components, which reduces the cumulative effect of parasitic reactances. Maintenance requirements are low and the circuit can conveniently be made to be quite rugged. Furthermore, output pulses with reversed polarity can be obtained by reversing the diode polarity, or in the transistor case, changing the conductivity type, regardless of the input pulse polarity. Frequency response as high as a fraction of 1 nanosecond appears to be clearly feasible without significant structural modifications.

The foregoing is intended, however, to be merely illustrative of the inventive concepts involved. Various other modifications and embodiments may be made by those skilled in the art without departing from the spirit and scope of the invention.

What is claimed is:

1. An exclusive OR circuit suitable for use in systems using signal pulses having durations in the nanosecond range or less comprising:

a primary winding having first and second ends to which first and second input signals may be applied;

a balance detector circuit coupled to the primary winding;

the detector circuit comprising a first secondary winding inductively coupled to and coextensive with a first part of the primary winding and a second secondary winding inductively coupled to and coextensive with a second part of the primary winding;

first ends of the first and second secondary windings being closely adjacent a middle portion of the primary winding and being relatively remote from the first and second ends of the primary winding;

second ends of the first and second secondary windings being relatively remote from the middle portion of the primary winding;

the first ends of the first and second secondary windings being respectively connected to first and second rectifying diodes;

said first and second rectifying diodes being connected to a load.

2. In the exclusive OR circuit of claim 1 wherein:

the first and second secondary windings each have one end connected to a diode and another end grounded.

3. The exclusive OR circuit of claim 2 wherein:

the first secondary winding is intertwined with the first part of the primary winding, the second secondary winding is intertwined with the second part of the primary winding, and the primary and secondary windings are wound about a ferrite core.

4. The exclusive OR circuit of claim 3 wherein:

the load is a two terminal load circuit having one terminal connected to the diodes and the other terminal grounded.

5. An exclusive OR circuit suitable for use in systems using signal pulses having durations in the nanosecond range or less comprising:

a primary winding having first and second ends to which first and second input signals may be applied;

a balanced detector circuit coupled to the primary winding;

the detector circuit comprising a first secondary winding inductively coupled to and coextensive with a first part of the primary winding and a second secondary winding inductively coupled to and coextensive with a second part of the primary winding;

first ends of the first and second secondary windings being closely adjacent a middle portion of the primary winding and being relatively remote from the first and second ends of the primary winding;

second ends of the first and second secondary windings being relatively remote from the middle portion of the primary winding;

the first ends of the first and second secondary windings being respectively connected to first and second rectifying barrier devices;

said first and second rectifying barrier devices being connected to a load.

6. The exclusive OR circuit of claim 5 wherein:

said rectifying barrier devices are rectifying diodes.

7. The exclusive OR circuit of claim 5 wherein:

the rectifying barrier devices are transistors.

8. The exclusive OR circuit of claim 7 wherein:

said transistors each comprise a base, collector, and emitter;

the base of the first transistor is connected to the first secondary winding, and the base of the second transistor is connected to the second secondary winding.

9. The exclusive OR circuit of claim 8 wherein:

a direct current base voltage is applied to the bases of the first and second transistors via the first and second secondary windings, respectively; and a collector voltage is applied to the collectors of the first and second transistors via a collector resistor.

10. The exclusive OR circuit of claim 9 wherein:

the emitters of the transistors are interconnected.

* * * * *